United States Patent
Katano et al.

(10) Patent No.: US 10,758,327 B2
(45) Date of Patent: Sep. 1, 2020

(54) ELECTRIC TOOTHBRUSH WITH RIGIDLY CONNECTED GRIP PORTION AND BRUSH PORTION

(71) Applicants: Colgate-Palmolive Company, New York, NY (US); Omron Healthcare Co., Ltd., Kyoto (JP)

(72) Inventors: Mamoru Katano, Kyoto (JP); Hiroshi Nakamori, Kyoto (JP)

(73) Assignees: Colgate-Palmolive Company, New York, NY (US); Omron Healthcare Co., Ltd., Kyoto (JP)

( * ) Notice: Subject to any disclaimer, the term of this patent is extended or adjusted under 35 U.S.C. 154(b) by 69 days.

(21) Appl. No.: 16/084,811

(22) PCT Filed: Mar. 14, 2017

(86) PCT No.: PCT/US2017/022274
§ 371 (c)(1),
(2) Date: Sep. 13, 2018

(87) PCT Pub. No.: WO2017/160816
PCT Pub. Date: Sep. 21, 2017

(65) Prior Publication Data
US 2019/0069978 A1    Mar. 7, 2019

(30) Foreign Application Priority Data

Mar. 15, 2016 (JP) .................... 2016-051505

(51) Int. Cl.
A61C 17/22    (2006.01)
A61C 17/34    (2006.01)
A61C 1/12     (2006.01)

(52) U.S. Cl.
CPC .............. *A61C 17/225* (2013.01); *A61C 1/12* (2013.01); *A61C 17/22* (2013.01); *A61C 17/222* (2013.01); *A61C 17/3481* (2013.01)

(58) Field of Classification Search
CPC .. A61C 17/222; A61C 17/225; A61C 17/3481
See application file for complete search history.

(56) References Cited

U.S. PATENT DOCUMENTS 8,336,155 B2    12/2012  Crossman et al.
8,966,694 B2    3/2015   Iwahori et al.
(Continued)

FOREIGN PATENT DOCUMENTS

CN    101297776    5/2012
CN    102429739    5/2012
(Continued)

OTHER PUBLICATIONS

International Search Report and Written Opinion of the International Searching Authority in International Application No. PCT/US2017/022274, dated May 24, 2017.

*Primary Examiner* — Randall E Chin

(57) ABSTRACT

An electric toothbrush includes a grip portion, a brush portion, and a joint arrangement for connecting the two portions. The joint arrangement has an upper cylinder portion and a lower cylinder portion, with an axis of the upper cylinder portion being inclined a predetermined angle with respect to an axis of the lower cylinder portion. The grip portion is connected to the lower cylinder portion and the brush portion is connected to the upper cylinder portion, so that the grip portion and the brush portion are inclined by the predetermined angle.

6 Claims, 10 Drawing Sheets

(56) References Cited

U.S. PATENT DOCUMENTS

| | | | | |
|---|---|---|---|---|
| 9,724,181 B2* | 8/2017 | Schaefer | ............ | A61C 17/3436 |
| 2010/0263147 A1* | 10/2010 | Crossman | .......... | A61C 17/3463 |
| | | | | 15/167.1 |
| 2011/0056033 A1* | 3/2011 | Iwahori | .................... | A46B 5/02 |
| | | | | 15/23 |
| 2014/0298603 A1* | 10/2014 | Hall | ..................... | A61C 17/222 |
| | | | | 15/22.1 |

FOREIGN PATENT DOCUMENTS

| JP | H06-72419 U | 10/1994 |
|---|---|---|
| JP | H07-25828 U | 5/1995 |
| JP | 3136872 U | 11/2007 |
| JP | 2008-080099 A | 4/2008 |

* cited by examiner

ELECTRIC TOOTHBRUSH WITH RIGIDLY CONNECTED GRIP PORTION AND BRUSH PORTION

CROSS-REFERENCE TO RELATED PATENT APPLICATIONS

This application claims the benefit of priority to Japanese Patent Application Serial No. 2016-051505, filed Mar. 15, 2016, the entirety of which is incorporated herein by reference.

BACKGROUND OF THE INVENTION

(1) Field of the Invention

The present invention relates to an electric toothbrush having a grip portion and a brush portion, and more particularly, to the structure of the electric toothbrush.

(2) Description of Related Art

The electric toothbrush in the market has the grip portion and the brush portion with an indicator located in the grip portion. Also, the electric toothbrush in the market has the brush portion angled or inclined with respect to the grip portion. Such an electric toothbrush is disclosed, for example, in US Patent Publication No. 2011-0056033 (corresponding to Japanese Patent Publication No. 2009-268828).

According to US Patent Publication No. 2011-0056033, the indicator is provided on only one side of the electric toothbrush where the bristle is provided, so that the user can view the indicator only when the electric toothbrush is held at a certain angle. It is difficult for the user to see the indicator when the electric toothbrush is held in sideways, particularly when the user is brushing the inside surface of the tooth.

Also, according to US Patent Publication No. 2011-0056033, since the brush portion is angled or inclined with respect to the grip portion, the tension or stress observed at a joint between the grip portion and brush portion will be relatively high, particularly when the user pushes the brush hard against the teeth. There is no detailed description in US Patent Publication No. 2011-0056033 on the structure of connection between the grip portion and the brush portion.

BRIEF SUMMARY OF THE INVENTION

(1) Problems to be Solved

The prior art electric toothbrush has such problem that the tension between the grip portion and the brush portion will be relatively high, as explained above. An object of the present invention is to provide an electric toothbrush which has a rigid connection between the grip portion and the brush portion.

(2) Means for Solving the Problems

According to the present invention, an electric toothbrush having a grip portion and a brush portion with an axis of the brush portion being angled or inclined a predetermined angle with respect to an axis of the grip portion, comprises: a stem accommodated in the brush portion, said stem having a cavity for installing a vibration generator, a first screw groove formed at a bottom of the stem, and a first engage member formed adjacent the first screw groove; a cylindrical body included in the grip portion and having a receiving opening; and a stem joint arrangement including a stem joint for connecting the brush portion and the grip portion, wherein said stem joint having an upper cylinder portion and a lower cylinder portion, with an axis of the upper cylinder portion being inclined a predetermined angle with respect to an axis of the lower cylinder portion, and wherein the upper cylinder portion is formed with a second screw groove, and a second engage member adjacent the second screw groove, whereby the lower cylinder portion is inserted in the receiving opening formed in the cylindrical body, and the first screw groove engages with the second screw groove in a screwing manner, and the first engage member engages with the second engage member.

According to an embodiment, the first screw groove is a male screw groove, and the second screw groove is a female screw groove.

According to an embodiment, the first engage member is a projection, and the second engage member is a recess.

According to an embodiment, the stem joint arrangement further includes a stem packing made of rubber and a rubber cover covering the lower cylinder portion.

According to an embodiment, the cylindrical body is formed with a plurality of blocks in the receiving opening, and the lower cylinder portion is formed with a plurality of indents which engage with the blocks.

According to the electric toothbrush of the present invention, since a stem joint having an upper cylinder portion and a lower cylinder portion inclined to each other is used, the grip portion and the brush portion will not be easily separated even when a tension or stress is applied therebetween.

DETAILED DESCRIPTION OF THE INVENTION

Figure 1:
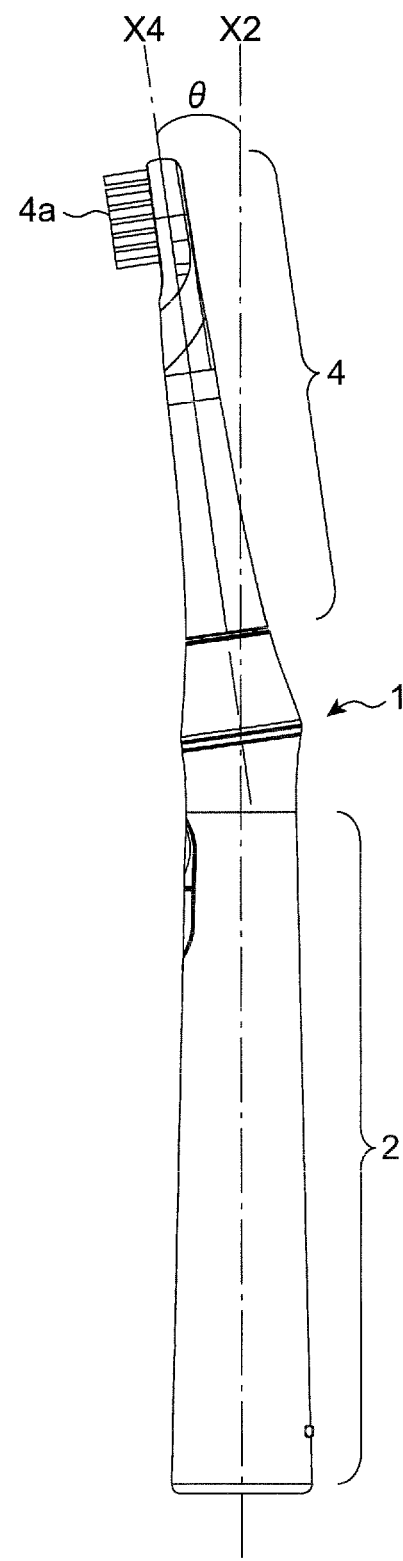
FIG. 1 is a side view of an electric toothbrush according to an embodiment of the present invention.

Referring to FIG. 1, an electric toothbrush 1 according to an embodiment of the present invention is shown. The electric toothbrush 1 has a grip portion 2 and a brush portion 4. An axis X4 of the brush portion 4 is angled or inclined a predetermined angle θ, such as for example but not limited to between about 6 and about 10 degrees, most preferably about 8 degrees, with respect to an axis X2 of the grip portion 2 so that a bristle portion 4a of the brush portion 4 can be easily held against a user's tooth when the grip portion 2 is held by the user proximate the user's mouth. As will be discussed below, the axis X4 and the axis X2 can be considered to be defined by the upper cylinder portion 42a and the lower cylinder portion 42b of the stem joint 42, respectively, in certain embodiments.

Figure 2:
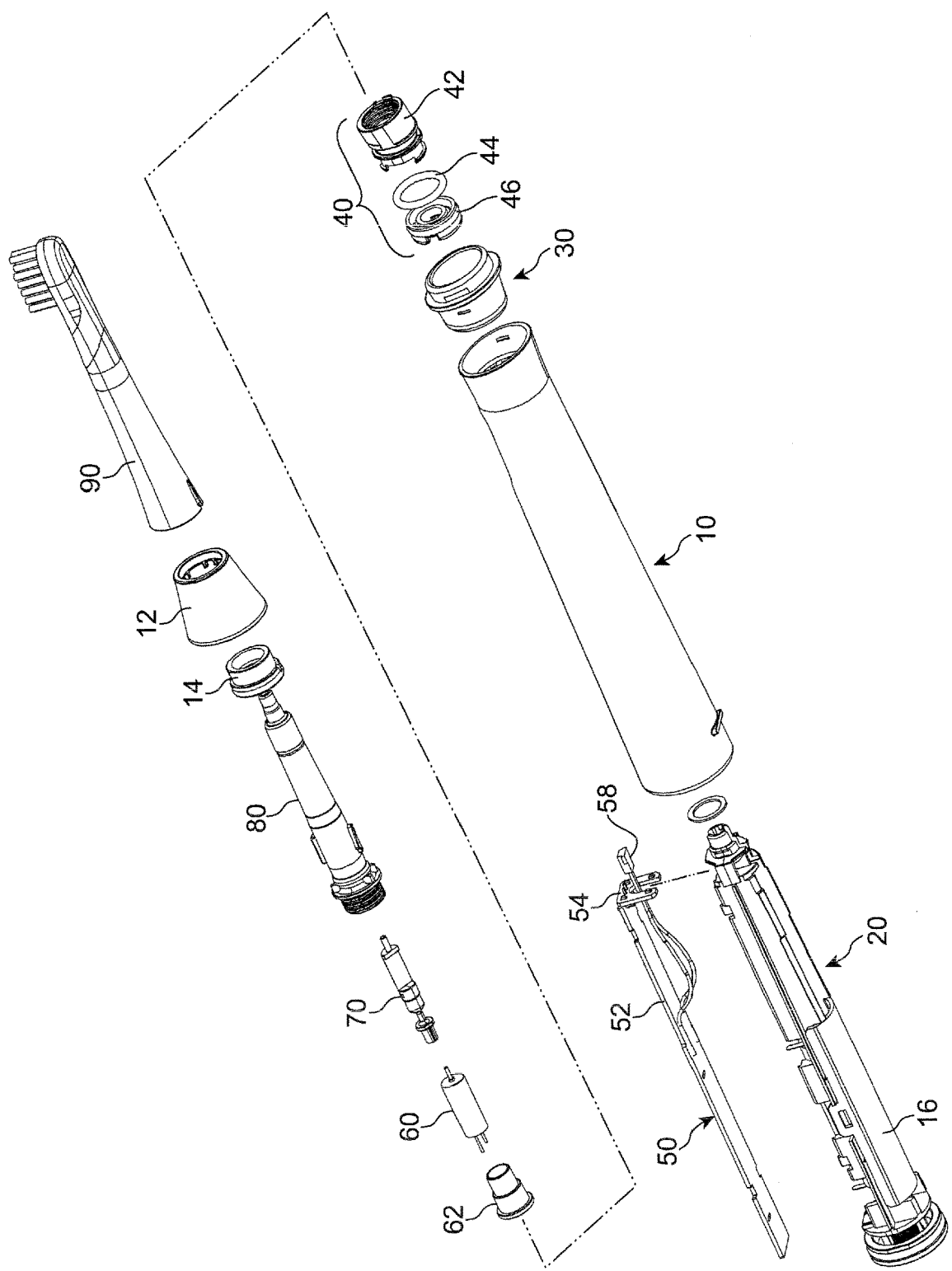
FIG. 2 is an exploded view of the electric toothbrush shown in FIG. 1.

Referring to FIG. 2, an exploded view of the electric toothbrush 1 is shown. The grip portion 2 of the electric toothbrush 1 includes an elongated body cover 10, a chassis 20, a battery holder 16, a motor support 62, and an elongated circuit board 50. An intermediate portion including an illumination ring body 30, a stem joint arrangement 40, and a top cover 12, is positioned between and arranged to couple the grip portion 2 to the brush portion 4. The electric toothbrush further includes a stem 80 that is connected to and extends from the intermediate portion. The stem 80 accommodates a DC motor 60 having a cylindrical body, and a vibration shaft 70. A top rubber cover 14 is also provided as part of the intermediate portion. The brush portion 4 includes a replaceable brush 90. A battery to be inserted in the battery holder 16 is a rechargeable battery or a dry cell battery. The replaceable brush 90 is detachably mounted on the stem 80. The replaceable brush 90 covers the stem 80 completely or partially.

In the specification, the term "top" or "upper" refers to the side of the electric toothbrush 1 where the replaceable brush 90 is provided, and the term "bottom" or "lower" refers to the side where the battery holder 16 is provided, such as shown in FIG. 1.

The body cover 10 has an interior cavity, which may be for example, cylindrical, for accommodating the chassis 20, battery holder 16 and circuit board 50. The body cover 10 has a top side and a bottom side opened. The body cover 10 is capable of being gripped or grasped by a user.

Figure 3:
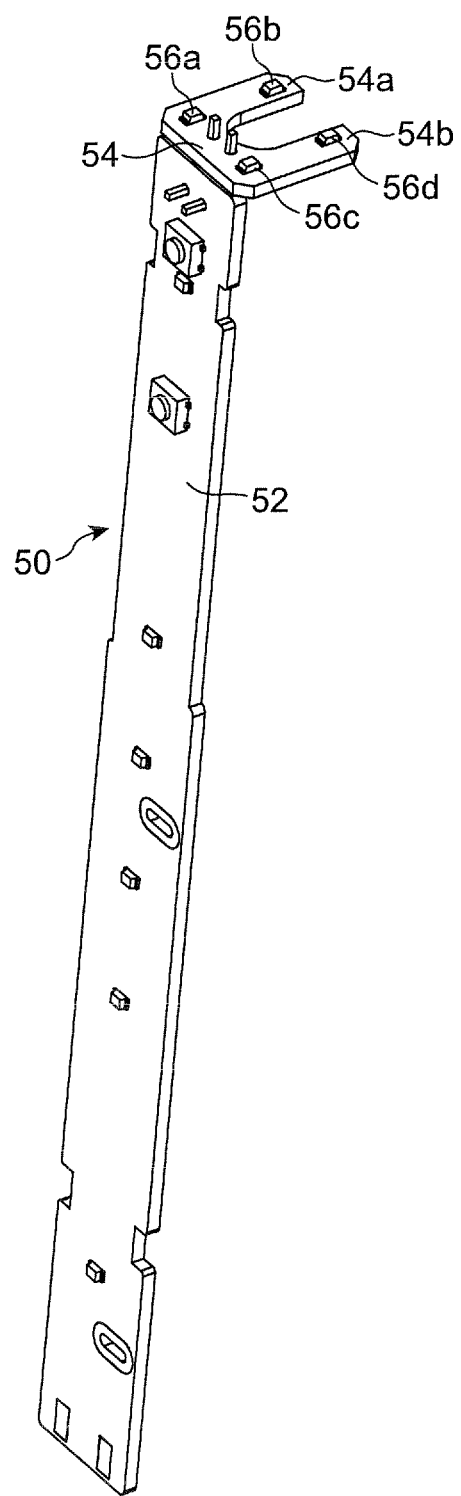
FIG. 3 is a perspective view of a circuit board shown in FIG. 2.

As shown in FIG. 3, the circuit board 50 has an elongated board 52 and a light emitting element support plate which is a U-shaped plate 54 firmly connected to a top end of the elongated board 52. The U-shaped plate 54 has two arms 54a and 54b extending perpendicularly from the top end of the elongated board 52. Two light emitting elements, such as light-emitting diodes (LEDs) 56a and 56b are mounted on one arm 54a, and another two LEDs 56c and 56d are mounted on other arm 54b, so that four LEDs 56a, 56b, 56c and 56d are located, when viewed from the top, at four corners of a rectangle, or a square. While four LEDs 56a, 56b, 56c and 56d are shown and described here, more or fewer LEDs may be located on the plate 54. Moreover, the LEDs may be discrete LED sources or they could include one or more flexible printed or organic LED substrates capable of illumination. Turning ON and OFF of the LEDs 56a, 56b, 56c and 56d are controlled by a controller mounted on the circuit board 50. The controller includes a microprocessor and an acceleration sensor. The acceleration sensor is used for detecting the angle of the toothbrush held by a user. As shown in FIG. 2, a connector 58 extends through the center of the U-shaped plate 54 for electrical connection with the DC motor 60.

Figure 4:
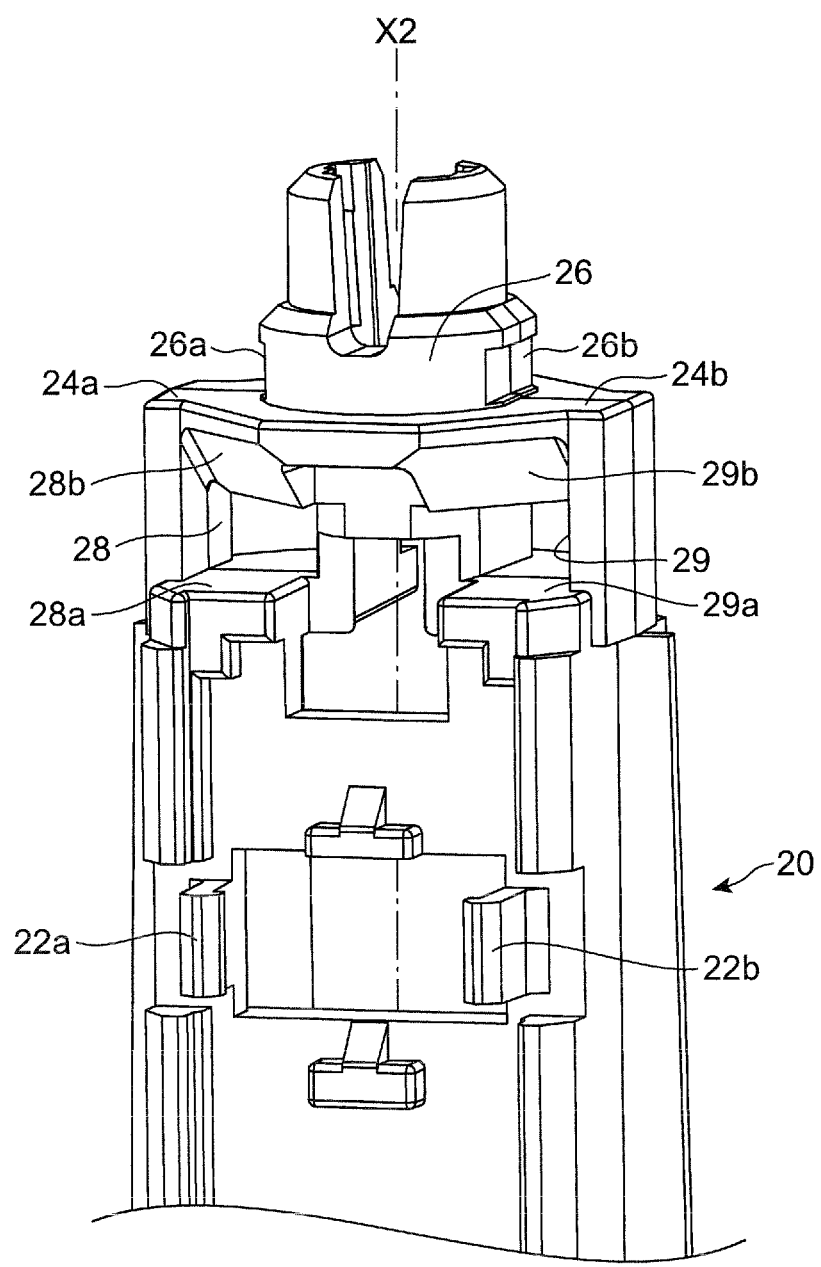
FIG. 4 is a perspective partial view of a chassis shown in FIG. 2.

Referring to FIG. 4, a top portion of chassis 20 is shown. Chassis 20 has a pair of fingers 22a and 22b for holding the elongated board 52, a pair of shoulders 24a and 24b, and a neck portion 26. The neck portion 26 has a center hole in the direction of axis X2, with recesses 26a and 26b formed at opposite sides thereof. Through-holes 28 and 29 are formed, respectively, under the shoulders 24a and 24b. The through-holes 28 and 29 have bottom surfaces 28a and 29a, respectively, which are flattened for receiving thereon, respectively, the two arms 54a and 54b of the U-shaped plate 54.

The two arms 54a and 54b of the U-shaped plate 54 are inserted in the through-holes 28 and 29, respectively, as shown in FIG. 2, and the elongated board 52 is firmly held between the fingers 22a and 22b. Also, the connector 58 extends through the center hole in the neck portion 26. When the arms 54a and 54b of the U-shaped plate 54 are placed on bottom surfaces 28a and 29a of the through-holes 28 and 29, the LEDs 56a, 56b, 56c and 56d on the two arms 54a and 54b face the top, i.e., in the direction of axis X2.

The through-holes 28 and 29 further have top slanted surfaces 28b and 29b which are for reflecting purposes and are angled about 45 degrees with respect to the direction of axis X2 so that light rays emitted from the LEDs, particularly, from 56a and 56c reflect on the slanted surfaces 28b and 29b, and direct outwardly in a radial or otherwise substantially perpendicular direction with respect to the axis X2. In FIG. 4, only two slanted surfaces 28b and 29b are shown, but there are two more slanted surfaces 28c and 29c on the other side in FIG. 4. The slanted surfaces 28b, 28c, 29b and 29c are angled about 45 degrees with respect to axis X2 in radial direction, so that slanted surfaces 28b, 28c, 29b and 29c are arranged in a manner similar to an umbrella surface. Each of the slanted surfaces 28b, 28c, 29b and 29c is flat, but it may be curved. The light rays emitted from the LEDs 56a, 56b, 56c and 56d in the direction of axis X2 are reflected on the slanted surfaces 28b, 28c, 29b and 29c, and are further directed in the radial direction or otherwise substantially perpendicular with respect to the axis X2.

Figure 5A:
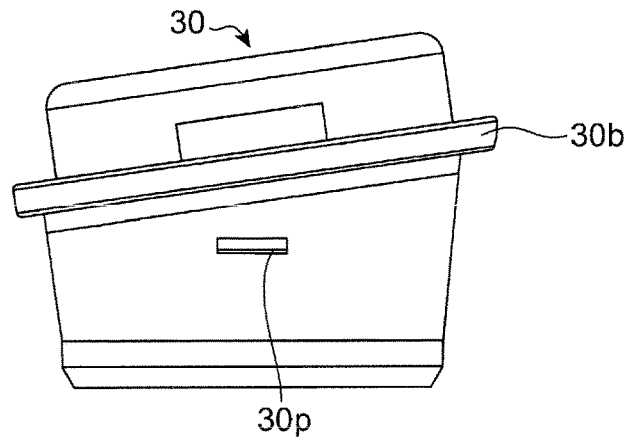
FIG. 5A is a side view of an illumination ring body shown in FIG. 2.
Figure 5B:
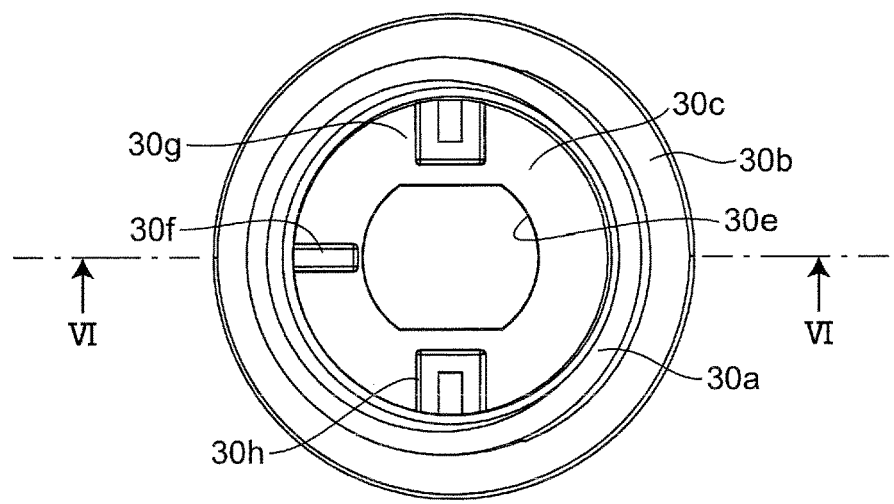
FIG. 5B is a top plan of the illumination ring body shown in FIG. 5A.
Figure 6:
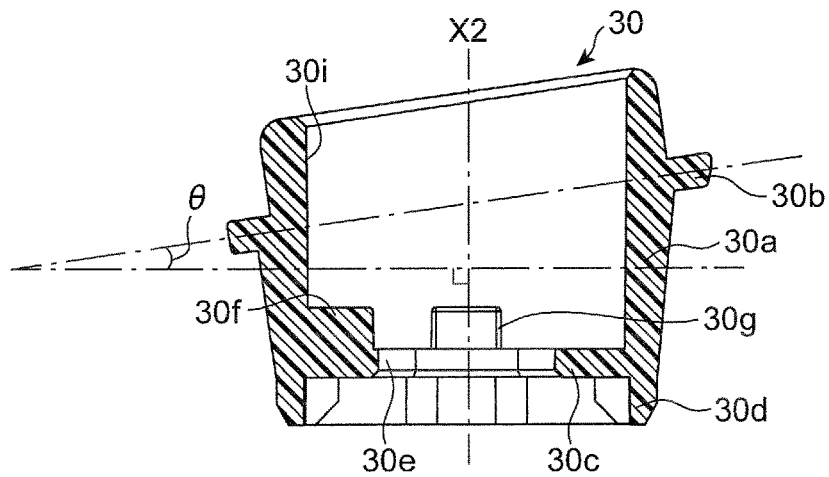
FIG. 6 is a cross-sectional view of the illumination ring body taken along line VI-VI shown in FIG. 5B.
Figure 8:
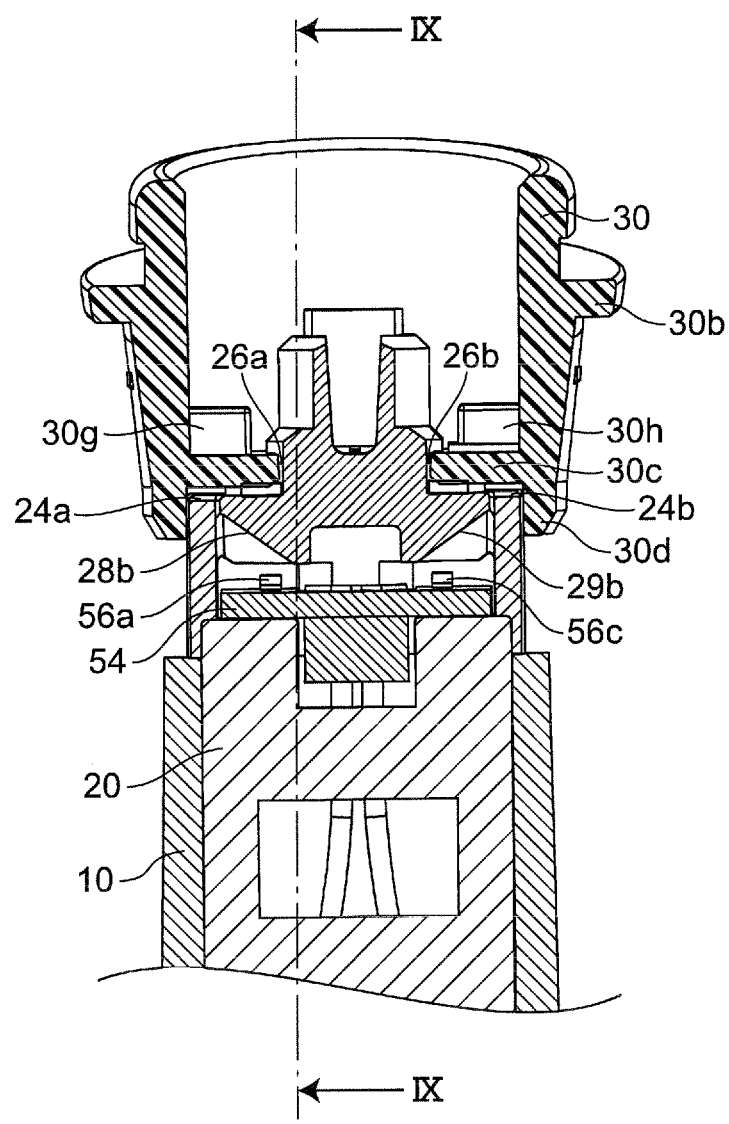
FIG. 8 is a cross-sectional partial view taken along line VIII-VIII shown in FIG. 7.

Referring to FIGS. 5A and 6, the illumination ring body 30 is shown which is made of a substantially transparent or translucent material, such as synthetic resin. The illumination ring body 30 has hollow cylindrical body 30a with an illumination ring 30b circumferentially surrounding the cylindrical body 30a. The illumination ring 30b is an annular structure that protrudes from the outer surface of the illumination ring body 30, thereby forming an annular flange. The illumination ring 30b is inclined or angled a predetermined angle θ, such as for example but not limited to between about 6 degrees and about 10 degrees, most preferably about 8 degrees, with respect to a plane perpendicular to the axis X2. The cylindrical body 30a, which is a part of the grip portion 2, has opposite ends opened, and has an internal plate 30c inside the cylindrical body 30a so as to provide a skirt wall 30d below the internal plate 30c. The center of the internal plate 30c is formed with an opening 30e (FIG. 5B) in a shape of semi-circle to fittingly match the semi-circle cross-section of the neck portion 26 with recesses 26a and 26b, as best shown in FIG. 8. Above the internal plate 30c, the cylindrical body 30a has a receiving opening 30i for fittingly receiving a lower cylinder portion 42b of the stem joint 42 covered with a bottom rubber cover 46, as will be described later. While the illumination ring body 30, including the cylindrical body 30a and illumination ring 30b, is shown and described as being cylindrical, one of skill in the art will recognize that other shapes and geometries are possible depending on the shape and design of the grip portion 2 of the electric toothbrush 1.

As shown in FIG. 5B, on the top surface of the internal plate 30c, there are three blocks 30f, 30g and 30h formed at corners between the internal plate 30c and the cylindrical body 30a.

On the outside of the illumination ring body 30, a pair of projections 30p are provided, as shown in FIG. 5A.

The chassis 20 provided with the circuit board 50 is inserted into the body cover 10 from the bottom opening, and held inside the body cover 10 at a position shown in FIG. 4, so that the top end of the chassis 20 stays a little below the top opening of the body cover 10.

Figure 7:
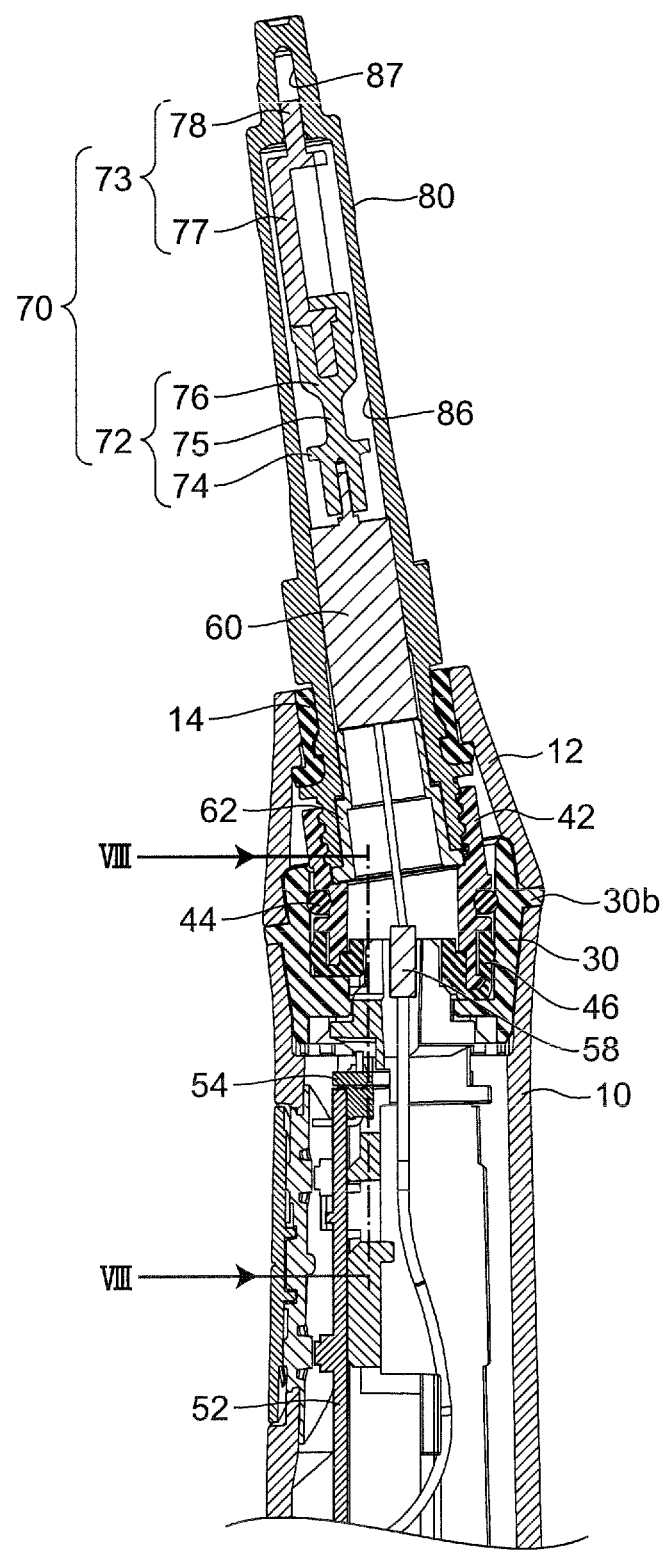
FIG. 7 is a cross-sectional partial view of the electric toothbrush shown in FIG. 1.

As shown in FIGS. 7 and 8, the illumination ring body 30 is mounted on the shoulders 24a and 24b of the chassis 20 such that neck portion 26 of the chassis 20 is fittingly inserted into the opening 30e. At this position, the bottom surface of the internal plate 30c rests on the shoulders 24a and 24b of the chassis 20, and the skirt wall 30d circumferentially surrounds, at least in part, the slanted surfaces 28b, 28c, 29b and 29c. The outer surface of the illumination ring body 30 below the illumination ring 30b is fittingly inserted into the top opening of the body cover 10 such that the projections 30p on the illumination ring body 30 engage with complementary recesses (not shown) formed on the inside surface of the body cover 10 to couple the body cover 10 to the illumination ring body 30.

Figure 9:
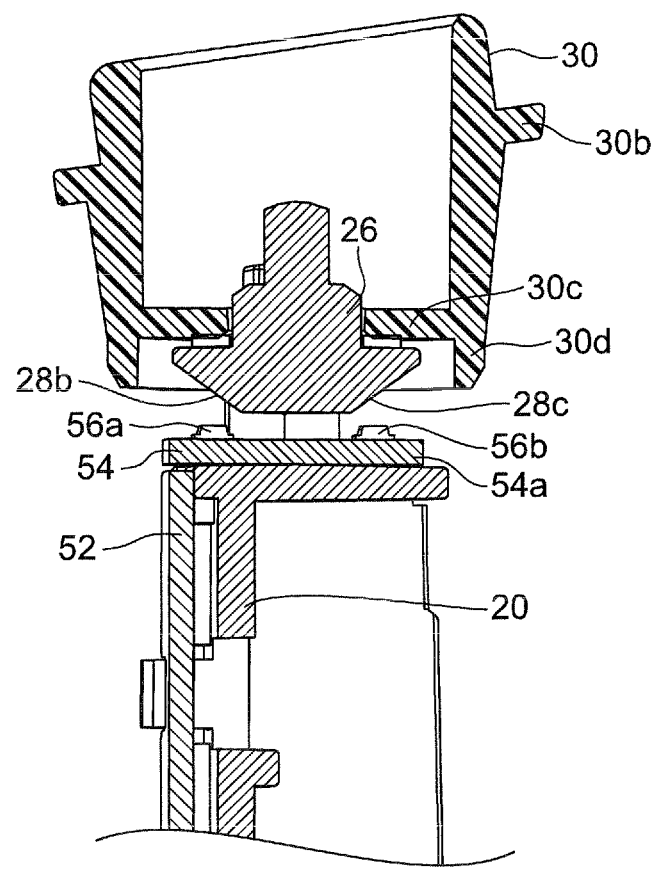
FIG. 9 is a cross-sectional partial view taken along line XI-XI shown in FIG. 8.

As shown in FIG. 9, the light emitted from the LEDs, such as 56a and 56b, reflects on the slanted surfaces 28b and 28c, and direct toward the skirt wall 30d, so that the light is optically transmitted within inside and throughout the illumination ring body 30. Some of this light will be transmitted into the illumination ring 30b and exit an outer annular surface of the illumination ring 30b that forms a portion of the exposed outer surface of the electric toothbrush.

As shown in FIG. 7, a majority of the illumination ring body 30 is concealed such that the portion below the illumination ring 30b is concealed by body cover 10, and the portion above the illumination ring 30b is concealed by top cover 12. Body cover 10 and top cover 12 may both be substantially opaque and may be made from the same or different materials. In this embodiment, only the illumination ring 30b can be viewed directly from the outside of the electric toothbrush 1.

The outside surface of the illumination ring body 30, with the exception for the illumination ring 30b, can be coated with a reflector paint so that light that has entered the illumination ring body 30 from the inside surface of the skirt wall 30d can be maintained within the illumination ring body 30 until said light can exit the illumination ring 30b. Stated simply, the reflector paint will prevent and/or minimize leakage of light. Thus, light from the illumination ring 30b can be outputted with high intensity outside the electric toothbrush 1.

Since the illumination ring 30b is provided in a viewable manner completely, i.e., 360 degrees, around the electric toothbrush 1 just above the grip portion 2, it is possible for the user to view the lighting of the illumination ring 30b no matter which angle the electric toothbrush 1 is held. It should be noted, however, that while the illumination ring 30b is an annular continuous structure in the illustrated embodiment, in other embodiments the illumination ring 30b may be in the form of spaced-apart segments that collectively define a segmented ring structure.

The lighting of the illumination ring 30b can be effected in various occasions in various modes, as explained below.

The first occasion is when a bristle portion of the electric toothbrush 1 is held at about 45 degrees above or below the plane level so that the bristle touches the tooth pockets of the upper or lower tooth from the outside or inside the tooth.

The second occasion is when the electric toothbrush 1 is held at about 90 degrees above or below the plane level so that the bristle touches the occlusal surface of the molar or pre-molar tooth.

The third occasion is when the electric toothbrush 1 is held at about the plane level so that the bristle touches the front face or back face of the tooth perpendicularly.

Each of the above occasions can be detected by the acceleration sensor in a manner disclosed, for example, in U.S. Publication No. 2012/0251975 (corresponding to Japanese Publication No. JP2011-156204) or Japanese Publication JP2009-291316, which are herein incorporated by reference in its entirety.

The lighting mode can be changed with respect to different occasions. For example, a first lighting mode can be an ON and OFF mode such that the LEDs are turned ON when the above explained target angle is detected.

A second lighting mode can be a graduation variable mode such that the LEDs change the strength of the light (i.e., the intensity of the light) to glow brighter as the toothbrush angle reaches the target angle.

A third lighting mode can be a blinking mode such that the frequency of ON and OFF of the LEDs becomes higher as the toothbrush angle reaches the target angle.

In one embodiment, the lighting can be effected only in one of the three occasions explained above using any one of the three lighting modes.

Referring to FIG. 2, the stem joint arrangement 40 includes a stem joint 42, a stem packing 44 and a bottom rubber cover 46.

Figure 10:
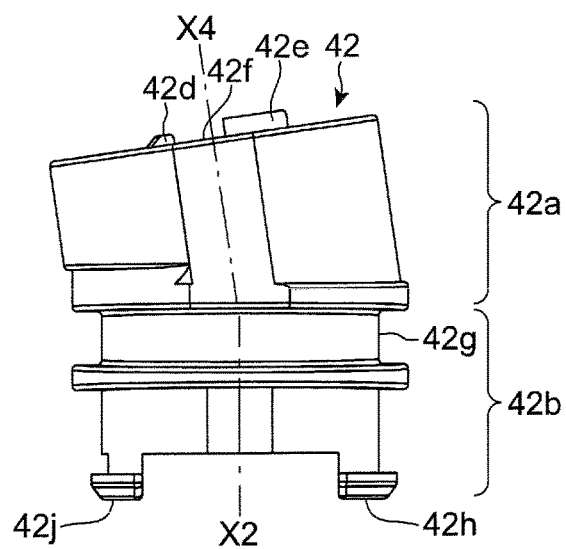
FIG. 10 is a side view of a stem joint shown in FIG. 2.
Figure 11:
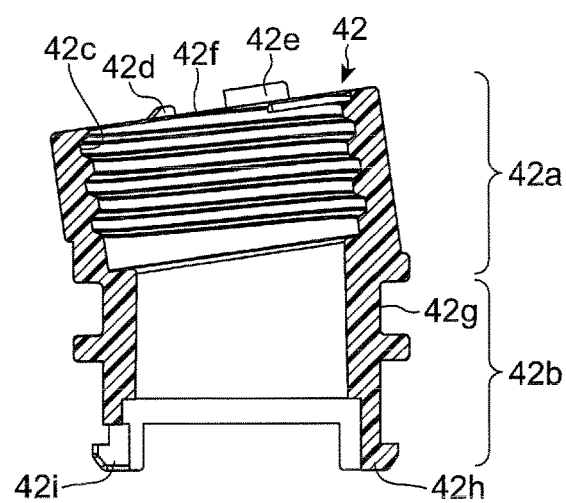
FIG. 11 is a cross-sectional view of the stem joint shown in FIG. 10.

Referring to FIGS. 10 and 11, the stem joint 42 has an upper cylinder portion 42a and a lower cylinder portion 42b. The upper cylinder portion 42a has its axis aligned with axis X4, and the lower cylinder portion 42b has its axis aligned with axis X2.

The upper cylinder portion 42a has an inside surface formed with female screw groove 42c. The top surface of the upper cylinder portion 42a is formed with a slanted projection 42d and a stopper projection 42e. The slanted projection 42d has one side formed with a slanted wall and the other side formed with an upright wall. The stopper projection 42e has opposite sides formed with upright walls. A receiving recess 42f, which is a second engage member (a first engage member will be described later), is formed adjacent the screw groove 42c, such as between the projections 42d and 42e, particularly between the upright wall of the slanted projection 42a and the upright wall of the stopper projection 42e.

Figure 12:
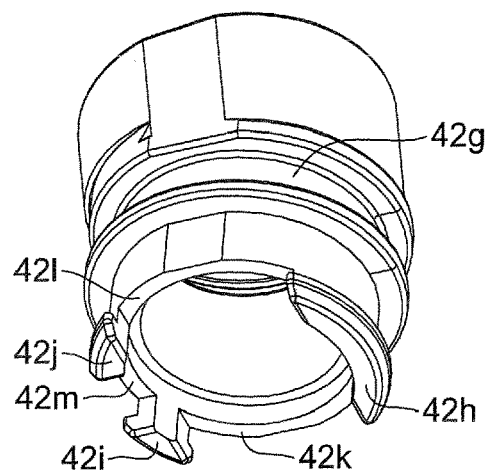
FIG. 12 is a perspective view of the stem joint shown in FIG. 11.

Referring to FIG. 12, the lower cylinder portion 42b has a recessed ring portion 42g and three legs 42h, 42i and 42j. As shown, legs 42i and 42j are mirror images of one another and together are positioned diametrically opposite the leg 42h. An indent 42k is formed between legs 42h and 42i. An indent 42l is formed between legs 42h and 42j. An indent 42m is formed between legs 42i and 42j.

The stem packing 44 as shown in FIGS. 2 and 7, made of rubber or a like material, is fittingly inserted in the recessed ring portion 42g (see FIGS. 10-12). The bottom rubber cover 46 as shown in FIGS. 2 and 7 is fittingly mounted on the lower cylinder portion 42b covering each of the legs 42h, 42i and 42j separately (see FIGS. 10-12). Accordingly, indents 42k, 42l and 42m appear on the outside of the bottom rubber cover 46.

Next, the connection between the lower cylinder portion 42b and the illumination ring body 30 is explained.

With reference to FIGS. 2 and 7, the lower cylinder portion 42b mounted with the bottom rubber cover 46 is fittingly inserted in the receiving opening 30i of the hollow cylindrical body 30a of the illumination ring body 30 such that indents 42k, 42l and 42m existing on the outside of the bottom rubber cover 46 fittingly receive three blocks 30g, 30h and 30f, respectively. Accordingly, the lower cylinder portion 42b is prevented from being freely rotated in the hollow cylindrical body 30a.

As shown in FIG. 7, stem 80 has an elongated cavity 86 for receiving a vibration generator including the vibration shaft 70 and the DC motor 60. The vibration shaft 70 includes an extension shaft 72 made, for example, of synthetic resin, such as POM (polyoxymethylene), and an eccentric shaft 73 which may be, for example, made of metal. The extension shaft 72 of the vibration shaft 70 includes a collar portion 74 provided close to a bottom end, a resilient shaft portion 75 and a connecting portion 76 which are integrally formed by synthetic resin. The bottom end face of the extension shaft 72 is formed with a recess to be engaged with a shaft of the DC motor 60. DC motor 60 has two wires extending from a bottom face thereof for electric connection with the circuit board 50 through connector 58. The vibration shaft 70 and the DC motor 60 are placed in the elongated cavity 86 and held in the cavity by the motor support 62.

The eccentric shaft 73 of the vibration shaft 70 includes an eccentric portion 77 and an axial shaft portion 78. The bottom end of the eccentric portion 77 is firmly connected to the connecting portion 76 by molding and the upper end of the eccentric portion 77 is provided with the axial shaft portion 78.

When the vibration shaft 70 rotates about its axis by the DC motor 60, the eccentric portion 77 generates a high frequency vibration which is transmitted to the stem 80 and to the brush 90. The resilient shaft portion 75 has a flexibility to receive the high frequency vibration of the eccentric portion 77.

Stem 80 is also formed by synthetic resin, such as for example, POM. A recessed hole 87 is formed at the end of the elongated cavity 86. The recessed hole 87 slidably receives the axial shaft portion 78. The elongated cavity 86 accommodates therein the vibration shaft 70 and the DC motor 60. The vibration shaft 70 is freely rotated in the elongated cavity 86. The recessed hole 87 serves as a bearing for freely holding the axial shaft portion 78. The vibration shaft 70 freely rotates inside the elongated cavity 86 even under high frequency vibration.

Since the recessed hole 87 serves as the bearing, it is not necessary to provide a separate bearing arrangement for rotatably holding the axial shaft portion 78.

Figure 13:
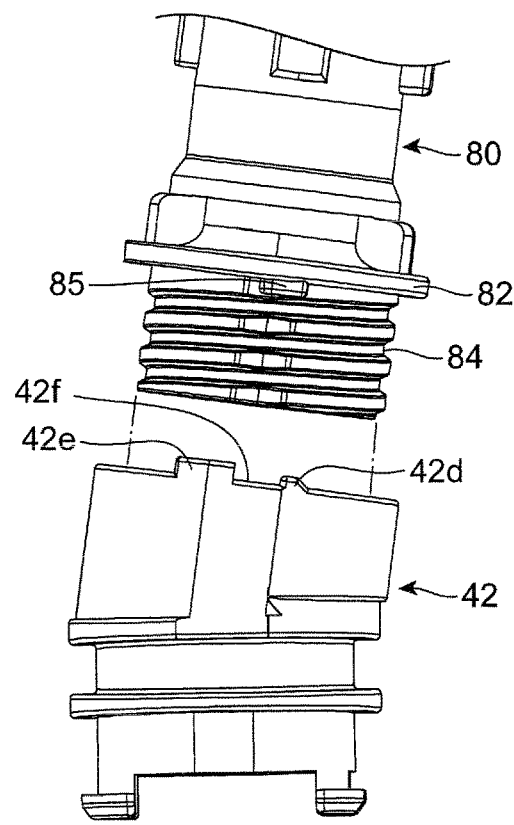
FIG. 13 is an exploded view of the stem joint and the stem.

Referring to FIG. 13, a lower end portion of the stem 80 is shown in detail. Stem 80 includes a collar 82, and a male screw groove 84 below the collar 82. A projection 85, which is a first engage member, is formed adjacent the screw groove 84, such as immediately under the collar 82, i.e., near the end of the screw groove 84.

Figure 14:
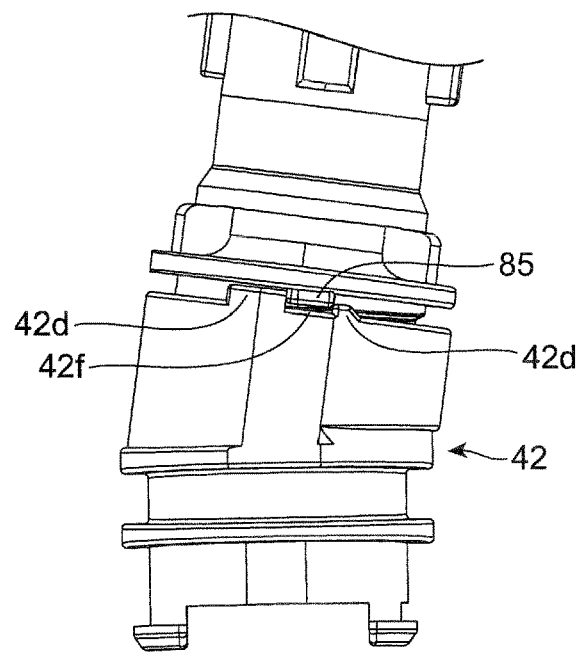
FIG. 14 is a side view of the stem joint and the stem in the connected condition.

Stem 80 is firmly connected to the stem joint 42 such that the male screw groove 84 of stem 80 is driven into the female screw groove 42c of the stem joint 42, as the stem 80 rotates about its axis X4. When the stem 80 rotates a predetermined number of turns, the projection 85, which is the first engage member, slides over the slanted wall of the slanted projection 42d, and falls into the receiving recess 42f, which is the second engage member, as best shown in FIG. 14. At this point, stem 80 is prevented from a further rotation in either direction and is retained at a desired and predetermined rotated position from the viewpoint of balance as well as to ensure that the brush 90 is properly oriented relative to the grip portion 2 when attached. The projection 85, which is the first engage member, and the receiving recess 42f, which is the second engage member, can be formed in opposite relationship, or any other engaging or retaining arrangement can be used. The male and female screw grooves 84 and 42c can be provided in opposite relationship.

As shown in FIGS. 2 and 7, the top rubber cover 14 is mounted on the stem 80 such that the bottom face of the top rubber cover 14 abuts against the upper surface of the collar 82. Then, the top cover 12 is mounted on the stem 80 such that the bottom face of the top cover 12 abuts against the upper surface of the illumination ring 30b.

According to an embodiment, suitable bonding agent is used in at least in one or more of the following instances: (a) between elongated body cover 10 and illumination ring body 30, (b) between illumination ring body 30 and stem joint 42, and (c) between stem joint 42 and stem 80.

According to the above described embodiment, the slanted surfaces 28b, 28c, 29b and 29c are provided in the chassis 20, but can be provided at any other places, such as at the bottom surface of the internal plate 30c of the illumination ring body 30. In still another embodiment, the slanted surfaces may be omitted and the light emitting elements 56a-d will be arranged to emit light directly into the illumination ring body 30. Additionally, while the illumination ring 30b is illustrated as being between the grip portion 2 and the brush portion 4, and more specifically the grip portion 2 and the intermediate portion, in other embodiment, the illumination ring 30b may be located at a lower position and entirely within the grip portion 4 or entirely within the intermediate portion.

INDUSTRIAL APPLICABILITY

The electric toothbrush can be used for oral health care.

KEYS TO THE REFERENCE NUMBERS

1 . . . electric toothbrush, 2 . . . grip portion, 4 . . . brush portion, 10 . . . body cover, 12 . . . top cover, 14 . . . top rubber cover, 16 . . . battery holder, 20 . . . chassis, 22a, 22b . . . fingers, 24a, 24b . . . shoulders, 26 . . . neck portion, 26a, 26b . . . recesses, 28, 29 . . . through-holes, 28b, 28c, 29b, 29c . . . slanted surfaces, 30 . . . illumination ring body, 30a . . . cylindrical body, 30b . . . illumination ring, 30c . . . internal plate, 30d . . . skirt wall, 30e . . . opening, 30f, 30g, 30h . . . blocks, 40 . . . stem joint arrangement, 42 . . . stem joint, 42c . . . female screw groove, 42d . . . slanted projection, 42e . . . stopper projection, 42h, 42i, 42j . . . legs, 42k, 42l, 42m . . . indents, 44 . . . stem packing, 46 . . . bottom rubber cover, 50 . . . elongated circuit board, 52 . . . elongated board, 54 . . . U-shaped plate, 56a, 56b, 56c, 56d . . . LEDs, 60 . . . DC motor, 62 . . . motor support, 70 . . . vibration shaft, 80 . . . stem, 90 . . . replaceable brush

The invention claimed is:

1. An electric toothbrush having a grip portion and a brush portion with an axis of the brush portion being angled or inclined at a predetermined angle with respect to an axis of the grip portion, said electric toothbrush comprising:
   a stem accommodated in the brush portion, said stem having a cavity for installing a vibration generator, a first screw groove formed at a bottom of the stem, and a first engage member formed adjacent the first screw groove;

a cylindrical body included in the grip portion and having a receiving opening; and a stem joint arrangement including a stem joint for connecting the brush portion and the grip portion, wherein said stem joint having an upper cylinder portion and a lower cylinder portion, with an axis of the upper cylinder portion being inclined a predetermined angle with respect to an axis of the lower cylinder portion, and wherein the upper cylinder portion is formed with a second screw groove, and a second engage member adjacent the second screw groove, whereby the lower cylinder portion is inserted in the receiving opening formed in the cylindrical body, and the first screw groove engages with the second screw groove in a screwing manner, and the first engage member engages with the second engage member.

2. The electric toothbrush as claimed in claim 1, wherein the first screw groove is a male screw groove, and the second screw groove is a female screw groove.

3. The electric toothbrush as claimed in claim 1, wherein the first engage member is a projection, and the second engage member is a recess.

4. The electric toothbrush as claimed in claim 1, wherein the stem joint arrangement further includes a stem packing made of rubber and a rubber cover covering the lower cylinder portion.

5. The electric toothbrush as claimed in claim 1, wherein the cylindrical body is formed with a plurality of blocks in the receiving opening, and the lower cylinder portion is formed with a plurality of indents which engage with the blocks.

6. An electric toothbrush having a grip portion and a brush portion, said electric toothbrush comprising:

a stem in the brush portion;

a cylindrical body included in the grip portion and having a receiving opening; and a stem joint arrangement including a stem joint, said stem joint having an upper cylinder portion and a lower cylinder portion, with an axis of the upper cylinder portion being inclined a predetermined angle with respect to an axis of the lower cylinder portion; and wherein the upper cylinder portion engages a bottom of the stem, and the lower cylinder portion is received in the receiving opening of the cylindrical body, thereby connecting the stem to the grip portion such that the brush portion extends along the axis and the grip portion extends along the axis.

* * * * *